United States Patent [19]
Sanner

[11] 3,819,972
[45] June 25, 1974

[54] NOVEL GLASS COMPOSITIONS AND CATHODE-RAY TUBES MADE THEREFROM

[75] Inventor: Richard Dean Sanner, Sylvania, Ohio

[73] Assignee: Owens-Illinois, Inc., Toledo, Ohio

[22] Filed: Feb. 28, 1972

[21] Appl. No.: 230,107

[52] U.S. Cl. .......................... 313/480, 106/52, 53; 250/108 R; 252/478
[51] Int. Cl. ............................................. C03c 3/04
[58] Field of Search .................. 106/52, 53; 313/64; 252/478; 250/108 R

[56] References Cited
UNITED STATES PATENTS

| | | | |
|---|---|---|---|
| 2,856,303 | 10/1958 | Armistead | 106/53 |
| 3,356,579 | 12/1967 | Harrington | 106/53 |
| 3,422,298 | 1/1969 | De Gier | 106/53 |
| 3,464,932 | 9/1969 | Connelly et al. | 106/53 |
| 3,663,246 | 5/1972 | La Grouw | 106/53 |

FOREIGN PATENTS OR APPLICATIONS 750,253   11/1970   Belgium

*Primary Examiner*—Helen M. McCarthy
*Attorney, Agent, or Firm*—Richard B. Dence; E. J. Holler

[57] ABSTRACT

Novel glass compositions containing strontium oxide are disclosed of enhanced chemical durability and working properties and x-ray absorbing capability. Cathode-ray tubes, in general, and color television tubes, in particular, may be formed from these glasses containing strontium oxide. These articles possess improved x-ray absorbing properties and increased resistance to adverse discoloration and browning of the glass.

9 Claims, No Drawings

NOVEL GLASS COMPOSITIONS AND CATHODE-RAY TUBES MADE THEREFROM

The present invention relates to novel glass compositions, more particularly, glass compositions containing strontium oxide which possess enhanced x-ray absorbing properties, chemical durability and working characteristics. The invention also pertains to cathode-ray envelopes of various types and particularly color television tubes made from the strontium oxide-containing glasses. These cathode-ray envelopes possess the desirable property of absorbing a considerable amount of the x-rays generated by the cathode-ray gun within the tube during operation of the cathode-ray tube at high voltages.

There has developed in the art a need for strontium oxide-containing glasses which possess both the property of good chemical resistance and relatively low-to-medium coefficients of thermal expansion. This need has arisen in connection with the use of rapidly operating glass-forming equipment employed for the large scale manufacture of glassware for the pharmaceutical and scientific industries. In these applications, it is necessary that the glassware possess a high level of chemical resistance against water, acids, alkali and the like since, in packaging pharmaceuticals, strongly acidic or alkaline solutions are very often incorporated into such glassware. Ampules, serum vials, transfusion bottles, antibiotic containers, drug jars, pill bottles, and the like are examples of such glassware. Also, in the physical and biological sciences, there is need for a resistant glassware for formation of tubing, tubes, beakers, flasks, filters and funnels which must be chemically resistant, because trace quantities of glass-leachable components would exert a detrimental effect on sensitive reactions or experimental determinations.

In its more specific applications, the present invention pertains to cathode-ray tubes which are subject to high voltage during operation and emit a small amount of x-rays through the faceplates and even through the walls of the funnel portion. X-rays are formed when a stream of rapidly moving, high energy electrons strikes matter and is slowed down. This sudden "breaking" of the electrons produces electromagnetic radiations of very short wavelength which are called x-rays. In use, cathode-ray tubes employ voltages which are sufficiently high to result in the production of x-rays within the tube.

The x-ray emission peak from a cathode-ray tube of the type employed in a color television set, for example, has a wavelength of approximately 0.7 Angstroms at 25,000 volts and a wavelength of approximately 0.5 Angstroms at 35,000 volts. Such levels of x-ray emission can cause problems. For example, whenever a television service technician adjusts the control to brighten the picture on the set, he must choose to increase the voltage across the tube. This action results in geometrically increasing the intensity of x-rays which are produced. It is necessary, therefore, to keep any such x-ray emission through the glass envelope of the cathode-ray tube at a sufficiently low level so that viewers, as well as adjacent non-viewers, are not subjected to serious x-ray exposure. One way in which the art has attempted to alleviate the x-ray exposure problem is to form a cathode-ray tube from a glass containing lead oxide as one of the major glass forming constituents.

Although the x-ray absorption properties are improved, when the cathode-ray tubes are made of lead-containing glasses, other disadvantages often attend the inclusion of substantial amounts of lead oxide in such glasses, including discoloration of the glass struck by the x-rays and by the stream of electrons. The problem of browning of the glass is particularly serious with respect to the faceplates of cathode-ray tubes, since high level transparency and essentially unimpeded light transmission are essential. Moreover, in the case of color television faceplates the problem is quite serious, since discoloration of the faceplate glass produces color distortion and adversely interferes with the quality and brightness of the images seen by the viewer. While in the past, cerium oxide frequently has been used in an attempt to offset this browning or discoloration, the discoloration problem is not totally alleviated. Another disadvantage attending the use of lead oxide is the increase in density of the glass and the resulting increase in the weight of the tube.

Borosilicate glasses have also been used in the past to increase the chemical durability against acids and water. However, such glasses generally possess poor chemical resistance and durability against alkali.

Another serious problem with prior art borosilicate glasses is the vapor loss due to the formation of highly volatile sodium borate. This loss may often cause cordiness in the glass and a weakness in the final product.

Still further problems which arise in the art are tendencies for glasses to separate into phases which cause a weakening of the glass and lowering of the chemical durability.

It is, therefore, an object of the present invention to provide glasses which overcome these and other disadvantages and shortcomings of the prior art.

It is a further object of the present invention to provide novel glass compositions which have improved durability and chemical resistance and also possess certain desired working characteristics.

It is still a further object of the present invention to provide glass compositions which can be used to form cathode-ray tubes which have good x-ray absorbing properties and resistance to adverse browning disclorations.

A still further, but no less important, objective of the present invention is the provision of a glass composition possessing a coefficient of thermal expansion in the low-to-medium coefficient range and which is suited to attain the foregoing objectives.

In attaining these and other objects of the invention, one feature of this invention resides in a silicate glass containing up to about 20 percent by weight of strontium oxide and relatively high amounts of potassium oxide.

Another feature of the present invention resides in a strontium oxide-containing silicate glass composition which contains less than 2% $Na_2O$ and at least 14% $K_2O$.

Another feature of the invention resides in a cathoderay tube assembly formed of, as essential components, a glass funnel, a glass faceplate and an electron gun wherein at least one of the glass members is formed of a glass-containing strontium oxide, less than 2% $Na_2O$ and at least 14% $K_2O$ by weight.

The above, as well as other, objects, features and advantages of the present invention will become apparent from the following detailed description of the invention.

The invention is broadly concerned with strontium oxide-containing glasses as used in a wide variety of applications, and also those having particular usefulness in the cathode-ray tube industry wherein the resultant tubes are made for operational use at voltages in the range of from about 20,000 to 40,000 volts. In its more detailed aspects, the present invention is particularly concerned with the composition of the glass from which the faceplate or the frontal portion of a cathode-ray tube, such as, for example, a television tube, is to be made. Accordingly, since the invention is not dependent upon the particular structure of a cathode-ray tube or conventional television tube, the invention may be readily comprehended and understood without need of illustration and, for that reason, no drawing is submitted.

Included in this invention are glasses typically used by the industry; namely, the soda-potash-barium glasses and the soda-potash-lead-barium glasses. More particularly, the glasses are those coming within the following compositional ranges where the ingredients are expressed in weight percent.

| Ingredient | Weight Percent |
|---|---|
| $SiO_2$ | 45 – 70 |
| $Na_2O$ | 0 – 1.6 |
| $K_2O$ | More than 14, up to 25 |
| $Al_2O_3$ | 0 – 6 |
| CaO | 0 – 8 |
| MgO | 0 – 3 |
| BaO | 0 – 20 |
| SrO | up to 20 |
| PbO | 0 – 30 |
| $Li_2O$ | 0 – 2 |
| $F_2$ | 0 – 2 |
| MnO | 0 – 2 |
| $TiO_2$ | 0 – 1 |
| $Sb_2O_3$ | 0 – 1 |
| $CeO_2$ | 0 – 1 |
| Rare earth oxides | 0 – 1 |

Other oxides can also be present in small amounts as long as they do not materially affect the basic characteristics of the glass. Other alkali metal oxides, i.e., $Rb_2O$ and $Cs_2O$, may be present up to 2 percent by weight. Colorants such as NiO, CoO and the like, whose purpose is to impart a desired shade of color to the glass, may also be present. For example, while it is ordinarily preferred that the glass should be essentially colorless for colored television face plates, in other cathoderay tube applications, coloration is frequently desirable. While the amount of SrO is indicated as being preferably up to 20 percent, generally from 1 to 15 percent is employed.

It has now been found that according to the present invention, there is a special relationship between the amount of soda, expressed as $Na_2O$, and potash, expressed as $K_2O$, in these glasses. Thus, although there are many conventional glasses wherein the wt. percent amounts of sodium oxide and potassium oxide are indicated as ranging, for example, from 0 to 10 and 0 to 15, respectively, it has been found in accordance with this invention that when the sodium oxide is present in an amount of less than 2, especially 0.5 to 1.6 percent, and the amount of $K_2O$ is at least 14 percent, for example, 14 to 25 percent, an unexpected change in the annealing point of the glass takes place. Thus, the glasses of the present invention have been found to have superior working properties in that the annealing point is at least 550° C. or above. This is a particularly useful characteristic in that it permits the formation of the glass faceplate and avoids deformation of the faceplate during the sealing operation when the faceplate is sealed to the funnel of the cathode-ray tube. Other strontium oxide-containing glasses which have larger amounts of sodium present and/or smaller amounts of potassium, have lower annealing point temperatures and special problems occur during sealing operations.

Another unexpected advantage of the glasses of the present invention resides in their resistance to browning, that is, discoloration due to electron bombardment. It has been found that glasses of this invention are virtually non-browning with respect to electron bombardment and are colorless to allow lighting from the faceplate edge. Significantly, the glasses of the present invention also exhibit forming and devitrification characteristics whereby they can be used in conventional pressing methods to produce the desired articles. These are important characteristics, particularly in large scale operations, which result in a considerable advance in the technology.

Furthermore, as compared to other strontium oxide glasses, the glasses of this invention exhibit higher annealing temperature characteristics and thereby avoid deformation of articles made from these glasses during sealing operations.

The following example is representative of the glasses of the present invention:

| Component | Weight Percent |
|---|---|
| $SiO_2$ | 62.1 |
| $Al_2O_3$ | 3.7 |
| $CeO_2$ | 0.9 |
| BaO | 1.9 |
| SrO | 12.2 |
| CaO | 1.55 |
| MgO | 1.0 |
| $Na_2O$ | 1.5 |
| $K_2O$ | 14.75 |
| Fluoride ($F^-$) | 0.7 |
| Oxygen Equivalent of $F^-$ | – 0.3 |
| | 100.0 |

The annealing point of this glass was measured as 558° C., density was 2.642 and the softening point was 760° C. The ferrous oxide content was about 0.01 percent.

Compared to similar glasses but where the amount of $Na_2O$ is greater and the amount of $K_2O$ is smaller, it was observed that the glass of this invention exhibits an unexpected increase in the softening point and increase in the annealing point.

For purposes of comparison, a glass having the following composition was prepared:

| Component | Weight Percent |
|---|---|
| $SiO_2$ | 68.59 |
| $Al_2O_3$ | 4.45 |
| $TiO_2$ | 0.72 |
| $CeO_2$ | 0.71 |
| BaO | 0.37 |
| SrO | 11.94 |
| CaO | 0.052 |
| MgO | 0.013 |
| $Na_2O$ | 5.74 |
| $K_2O$ | 5.25 |

-Continued

| Component | Weight Percent |
|---|---|
| $Li_2O$ | 1.96 |
| $Sb_2O_3$ | 0.28 |
| Chloride ($Cl^-$) | 0.018 |
| Fluoride ($F^-$) | 0.064 |
| Oxygen Equivalent of $Cl^-$ and $F^-$ | −0.03 |

This glass had a softening point of 683°C., an annealing temperature of 497°C., a ferric oxide content of 0.011 percent, and a density of 2.5939 grams per cubic centimeter.

Another commercially-available glass was obtained and analyzed to contain the following:

| Component | Weight Percent |
|---|---|
| $SiO_2$ | 67.63 |
| $Al_2O_3$ | 3.89 |
| $TiO_2$ | 0.79 |
| $CeO_2$ | 0.75 |
| PbO | 0.001 |
| BaO | 0.46 |
| SrO | 11.98 |
| CaO | 0.058 |
| MgO | 0.021 |
| $Na_2O$ | 6.76 |
| $K_2O$ | 5.39 |
| $Li_2O$ | 1.94 |
| $Sb_2O_3$ | 0.29 |
| Chloride ($Cl^-$) | 0.013 |
| Fluoride ($F^-$) | 0.11 |
| Oxygen Equivalent of $Cl^-$ and $F^-$ | −0.05 |

The ferric oxide content $Fe_2O_3$ was 0.008 percent. The density was 2.6005. The softening point was 675°C. and the annealing point was 489°C.

The following table contains additional data in respect of glasses of this invention:

TABLE I

| Glass Number | 1 | 1 | 2 | 2 | 2 | | 3 |
|---|---|---|---|---|---|---|---|
| Resistivity | Calc. | Analyzed | Calc. | Analyzed | High Temp. Resistivity | | Calc. |
| $SiO_2$ | 61.95% | 62.04% | 61.55% | 62.17% | °F. | OHM-CH. | 61.39% |
| $Al_2O_3$ | 3.52 | 3.81 | 3.50 | 8.70 | | | 3.52 |
| $Na_2O$ | 1.60 | 1.65 | 1.53 | 1.53 | 1600 | 398 | 1.53 |
| $K_2O$ | 15.70 | 15.01 | 15.60 | 14.74 | 1700 | 194 | 15.61 |
| CaO | 1.56 | 1.51 | 1.55 | 1.57 | 1800 | 125 | 1.49 |
| MgO | 1.02 | 0.97 | 1.02 | 0.99 | 1900 | 81 | 1.02 |
| BaO | 1.75 | 1.91 | 1.73 | 1.86 | 2000 | 51 | 1.74 |
| Fluoride ($F^-$) | 0.73/ | 0.46/ | 1.13/ | 0.70/ | 2100 | 35 | 1.43/ |
| Oxygen Equivalent of $F^-$ | −.31 | −.19 | −.48 | −.29 | | | −.60 |
| SrO | 12.01 | 12.23 | 11.94 | 12.23 | 2200 | 26 | 11.94 |
| Rare earth oxides | 0.03 | | 0.02 | 0 | 2300 | 20 | 0.02 |
| $CeO_2$ | 0.23 | 0.22 | 0.92 | 0.92 | 2400 | 15 | 0.92 |
| $Sb_2O_3$ | 0.20 | 0.17 | None | None | 2500 | 11 | None |
| $As_2O_3$ | None | | None | | | | None |
| Total $Fe_2O_3$ | | 0.038 | | | | | |
| Softening Point °C. | | 762 | | 759 | | | 753 |
| Annealing Point °C. | | 561 | | 558 | | | 553 |
| Strain Point °C. | | 514 | | 513 | | | 508 |
| Density gm/cc | | 2.6349 | | 2.6409 | | | 2.6386 |
| Expansion (0–300° C.) | | 93.6 | | 92.7 | | | 92.3 |
| Contraction (A.P.−25°C.) | | 111.5 | | 109.7 | | | 110.7 |
| X-Ray Transmission | | | | | | | |
| 0.175"$m^R$/hr. | | 4.6 | | | | | 3.38 |
| 0.100" | | 94 | | | | | 48 |
| 0.250" | | 0.24 | | | | | 0.24 |
| Electron Browning at 400 mµ 30 min. | | 8.7% | | 2.7% | | | 2.8% |
| 24 hr. | | 7.6% | | 2.4% | | | 2.4% |
| Viscosity | | | | | | | |
| Log η at 2.0 | | 2780°F. | | 2755°F. | | | 2760°F. |
| 2.5 | | 2525 | | 2505 | | | 2510 |
| 3.0 | | 2320 | | 2300 | | | 2305 |
| 4.0 | | 2005 | | 1995 | | | 1990 |
| 5.0 | | 1780 | | 1770 | | | 1765 |
| 6.0 | | 1610 | | 1600 | | | 1590 |
| 7.0 | | 1475 | | 1465 | | | 1455 |
| 7.6 | | 1405 | | 1400 | | | 1390 |
| Liquidus Temp. | | 1820°F. | | 1805°F. | | | 1767°F. |
| Log η at Liquidus | | 4.82 | | 4.84 | | | 5.0 |
| Primary Phase | | Strontium Silicate | | Strontium Silicate | | | Strontium Silicate |
| Sandwich Seal-Glass-Sol. Glass-Ceramic | | 700T | | | | | |
| Stress Optical Coefficient | | | | 2.791 | | | |
| K | | | | 5.1 | | | |

TABLE I —Continued

| Glass Number | 1 | 1 | 2 | 2 | 2 | 3 |
|---|---|---|---|---|---|---|
| | | | For Composition 3 | | | |
| Color -Ill. | | "C" at .250" | | 90.7% | | After Solarization 90.5% |
| Brightness | | | | .3105 | | .3105 |
| X | | | | .3171 | | .3172 |
| Y | | | | | | |

Additional examples of glasses of this invention are shown below:

TABLE II (Calculated Values)

| | 4 | 5 |
|---|---|---|
| $SiO_2$ | 64.18 | 62.94 |
| $Al_2O_3$ | 3.62 | 3.62 |
| $Na_2O$ | 1.60 | 1.59 |
| $K_2O$ | 15.69 | 15.69 |
| CaO | 1.56 | 1.56 |
| MgO | 1.02 | 1.02 |
| BaO | 1.73 | 0.23 |
| Fluoride ($F^-$) | 0.03 | 0.03 |
| $O_2$ Equiv. | −0.01 | −0.01 |
| SrO | 10.11 | 12.87 |
| Rare earth oxides | 0.03 | 0.03 |
| $CeO_2$ | 0.23 | 0.22 |
| $Sb_2O_3$ | 0.20 | 0.20 |
| Fiber Soft. Pt. | 791° C. | 791° C. |
| Anneal. Pt. | 581° C. | 586° C. |
| Strain. Pt. | 432° C. | 437° C |

It will be readily apparent that the glasses of this invention having the relatively lower amount of $Na_2O$ and the greater amount of $K_2O$ have an unexpected difference in the properties with respect to glasses of the prior art which would appear to be similar.

When reference is made in the specification and claims to a cathode-ray tube, such as a color television tube, it is to be understood that such tube comprises a funnel portion, a faceplate sealed to the funnel portion in any known manner, and an electron gun comprising a cathode which emits electrons. The inner surface of the faceplate has a fluorescent screen formed thereon which glows under the impact of high speed electrons.

By way of illustration, in a 25-inch color television tube, the faceplate has a thickness of about 0.43 inches, the funnel portion is about 0.175 inches thick. However, the maximum or minimum thicknesses will depend to a certain extent on the composition of the glass and the design of the television tube.

In making the glasses of this invention, suitable glass batch materials such as the following ingredients may be used:

Portage Sand
Soda Ash
Niter
Calcined Potash
Barium Carbonate
Litharge
Montana Felspar
Foote Mineral Spodumene
Strontium Carbonate
Sodium Silica Fluoride
Manganese Ore
Antimony Oxide
Powder Blue Mix
Green Nickel Oxide Mix These are merely illustrative of the types of raw materials that are suitable. If desired, chemically pure oxides may be used.

The batch may be placed in a platinum crucible to form a melt at 2,700°–2750° F. Gas-fired furnaces may be used. After four hours of this temperature, the furnace may be cooled to 2,300° F. and the batch maintained therein for a total melting time of about 5 ½ hours. Helical stirrers may be employed to stir the batch. It is customary to have 0.5 percent excess oxygen in the furnace during this process. While strontium carbonate is preferred as the source of the strontium in the glass, strontium oxide, strontium silicate or strontium nitrate may be used in lieu thereof.

It is preferred to omit firing agents such as arsenic and antimony oxides from the batch in order to obtain desired non-browning properties.

The molten glass may be cast into faceplates and then cooled.

From the foregoing, and unexpected properties of improved x-ray absorption and decreased x-ray and electron browning of television tubes, it is clearly apparent that a technical advance has been made. From the above disclosure, a person having ordinary skill in the art can produce glass articles such as cathode-ray tubes having means therein which cause x-ray radiation and which articles are capable of absorbing almost all of the emitted x-rays and then transmit only a minor and safe amount therethrough.

I claim:

1. A cathode-ray tube comprising a glass-funnel portion, a glass faceplate sealed thereto, and a fluorescent screen on the inner surface of said faceplate, and an electron gun disposed within said sealed tube, said tube having the property of absorbing x-rays emitted from within the tube, said glass faceplate being formed of a glass having the following composition:

| Component | Weight Percent |
|---|---|
| $SiO_2$ | 61.39–64.18 |
| $Al_2O_3$ | 3.5–3.7 |
| $Na_2O$ | 1.5–1.6 |
| $K_2O$ | 14.75–15.7 |
| CaO | 1.49–1.56 |
| MgO | 1–1.02 |
| BaO | 0.23–1.9 |
| SrO | 10.11–12.87 |
| $CeO_2$ | 0.22–0.92 |
| $Sb_2O_3$ | 0–0.2 |
| Rare earth oxides | 0–0.03 |
| $F_2/O_2$ | 0.03–1.43/−(0.01–0.6) | wherein the annealing point is at least 550°C or above and the softening point is at least 753°C.

2. The cathode-ray tube as defined in claim 1, wherein the glass has the following composition:

| Component | Weight Percent |
|---|---|
| SiO$_2$ | 62.1 |
| Al$_2$O$_3$ | 3.7 |
| CeO$_2$ | 0.9 |
| BaO | 1.9 |
| SrO | 12.2 |
| CaO | 1.55 |
| MgO | 1.0 |
| Na$_2$O | 1.5 |
| K$_2$O | 14.75 |
| Fluoride (F$^-$) | 0.7 |
| Oxygen Equivalent | −0.3 |

3. The cathode-ray tube as defined in claim 1 wherein the glass has the following composition:

| Component | Weight Percent |
|---|---|
| SiO$_2$ | 61.95 |
| Al$_2$O$_3$ | 3.52 |
| Na$_2$O | 1.60 |
| K$_2$O | 15.70 |
| CaO | 1.56 |
| MgO | 1.02 |
| BaO | 1.75 |
| Fluoride (F$^-$) | 0.73 |
| Oxygen Equivalent | −.31 |
| SrO | 12.01 |
| Rare earth oxides | 0.03 |
| CeO$_2$ | 0.23 |
| Sb$_2$O$_3$ | 0.20 |

4. The cathode-ray tube as defined in claim 1 wherein the glass has the following composition:

| Component | Weight Percent |
|---|---|
| SiO$_2$ | 61.55 |
| Al$_2$O$_3$ | 3.50 |
| Na$_2$O | 1.53 |
| K$_2$O | 15.60 |
| CaO | 1.55 |
| MgO | 1.02 |
| BaO | 1.73 |
| Fluoride (F$^-$) | 1.13 |
| Oxygen Equivalent | −.48 |
| SrO | 11.94 |
| Rare earth oxides | 0.02 |
| CeO$_2$ | 0.92 |

5. The cathode-ray tube as defined in claim 1 wherein the glass has the following composition:

| Component | Weight Percent |
|---|---|
| SiO$_2$ | 61.39 |
| Al$_2$O$_3$ | 3.52 |
| Na$_2$O | 1.53 |
| K$_2$O | 15.61 |
| CaO | 1.49 |
| MgO | 1.02 |
| BaO | 1.74 |
| Fluoride (F$^-$) | 1.43 |
| Oxygen Equivalent | −.60 |
| SrO | 11.94 |
| Rare earth oxides | 0.02 |
| CeO$_2$ | 0.92 |

6. The cathode-ray tube as defined in claim 1 wherein the glass has the following composition:

| Compound | Weight Percent |
|---|---|
| SiO$_2$ | 64.18 |
| Al$_2$O$_3$ | 3.62 |
| Na$_2$O | 1.60 |
| K$_2$O | 15.69 |
| CaO | 1.56 |
| MgO | 1.02 |
| BaO | 1.73 |
| Fluoride (F$^-$) | 0.03 |
| O$_2$ Equiv. | −0.01 |
| SrO | 10.11 |
| Rare earth oxides | 0.03 |
| CeO$_2$ | 0.23 |
| Sb$_2$O$_3$ | 0.20 |

7. The cathode-ray tube as defined in claim 1 wherein the glass has the following composition:

| Compound | Weight Percent |
|---|---|
| SiO$_2$ | 62.94 |
| Al$_2$O$_3$ | 3.62 |
| Na$_2$O | 1.59 |
| K$_2$O | 15.69 |
| CaO | 1.56 |
| MgO | 1.02 |
| BaO | 0.23 |
| Fluoride (F$^-$) | 0.03 |
| O$_2$ Equiv. | −0.01 |
| SrO | 12.87 |
| Rare earth oxides | 0.03 |
| CeO$_2$ | 0.22 |
| Sb$_2$O$_3$ | 0.20 |

8. A glass composition capable of absorbing x-rays consisting essentially of the following compositions.

| Component | Weight Percent |
|---|---|
| SiO$_2$ | 61.39–64.18 |
| Al$_2$O$_3$ | 3.5–3.7 |
| Na$_2$O | 1.5–1.6 |
| K$_2$O | 14.75–15.7 |
| CaO | 1.49–1.56 |
| MgO | 1–1.02 |
| BaO | 0.23–1.9 |
| SrO | 10.11–12.87 |
| CeO$_2$ | 0.22–0.92 |
| Sb$_2$O$_3$ | 0–0.2 |
| Rare earth oxides | 0–0.03 |
| F$_2$/O$_2$ | 0.03–1.43/−(0.01–0.6) | wherein the annealing point ranges from 553°C. to 586°C. and the softening point ranges from 753°C. to 791°C.

9. A glass composition as set forth in claim 8 having the following composition:

| Component | Weight Percent |
|---|---|
| SiO$_2$ | 62.1 |
| Al$_2$O$_3$ | 3.7 |
| CeO$_2$ | 0.9 |
| BaO | 1.9 |
| SrO | 12.2 |
| CaO | 1.55 |
| MgO | 1.0 |
| Na$_2$O | 1.5 |
| K$_2$O | 14.75 |
| Fluoride (F$^-$) | 0.7 |
| Oxygen Equivalent | −0.3 |

* * * * *

UNITED STATES PATENT OFFICE
CERTIFICATE OF CORRECTION

PATENT NO. : 3,819,972
DATED : June 25, 1974
INVENTOR(S) : R. D. Sanner

It is certified that error appears in the above-identified patent and that said Letters Patent are hereby corrected as shown below:

Cols. 5 and 6, TABLE I, Under Glass Number 2 (second occurrence) $Al_2O_3$ Analyzed, "8.70" should be --3.70--;

Signed and Sealed this third Day of February 1976

[SEAL]

Attest:

RUTH C. MASON
Attesting Officer

C. MARSHALL DANN
Commissioner of Patents and Trademarks